(12) United States Patent
Okabe et al.

(10) Patent No.: US 12,462,809 B2
(45) Date of Patent: Nov. 4, 2025

(54) VOICE REGISTRATION DEVICE, CONTROL METHOD, PROGRAM, AND STORAGE MEDIUM

(71) Applicant: NEC Corporation, Tokyo (JP)

(72) Inventors: Koji Okabe, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 18/016,571

(22) PCT Filed: Jul. 27, 2020

(86) PCT No.: PCT/JP2020/028724
§ 371 (c)(1),
(2) Date: Jan. 17, 2023

(87) PCT Pub. No.: WO2022/024188
PCT Pub. Date: Feb. 3, 2022

(65) Prior Publication Data
US 2023/0282217 A1    Sep. 7, 2023

(51) Int. Cl.
*G10L 17/04* (2013.01)
*G10L 17/02* (2013.01)
*G10L 17/20* (2013.01)
*G10L 21/0208* (2013.01)

(52) U.S. Cl.
CPC .............. *G10L 17/04* (2013.01); *G10L 17/02* (2013.01); *G10L 17/20* (2013.01); *G10L 21/0208* (2013.01)

(58) Field of Classification Search
CPC ......... G10L 17/04; G10L 17/02; G10L 17/20; G10L 21/0208; G10L 2021/02082
See application file for complete search history.

(56) References Cited

U.S. PATENT DOCUMENTS

| 6,694,018 | B1 | 2/2004 | Omori | |
| 2011/0276331 | A1* | 11/2011 | Yamazaki | G10L 17/04 704/E17.001 |
| 2017/0323644 | A1 | 11/2017 | Kawato | |
| 2020/0286489 | A1* | 9/2020 | Park | G10L 13/00 |

(Continued)

FOREIGN PATENT DOCUMENTS

| JP | S63-228198 A | 9/1988 |
| JP | H02-244096 A | 9/1990 |
| JP | H06-138895 A | 5/1994 |

(Continued)

OTHER PUBLICATIONS

International Search Report for PCT Application No. PCT/JP2020/028724, mailed on Sep. 29, 2020.

*Primary Examiner* — Bhavesh M Mehta
*Assistant Examiner* — Jangwoen Lee

(57) ABSTRACT

The voice registration device 1X mainly includes a noise reproduction means 220X, a voice data acquisition means 200X, and a voice registration means 210X. The noise reproduction means 220X is configured to reproduce noise data during a time period in which voice input from a user is performed. The voice data acquisition means 200X is configured to acquire the voice data based on the voice input. The voice registration means 210X is configured to register the voice data or data generated based on the voice data as data to be used for verification relating to a voice of the user.

9 Claims, 13 Drawing Sheets

(56) References Cited

U.S. PATENT DOCUMENTS

2020/0327894 A1* 10/2020 Doi ........................ G10L 17/02
2021/0005215 A1* 1/2021 Fukutomi ............... G10L 25/84

FOREIGN PATENT DOCUMENTS

| | | | |
|---|---|---|---|
| JP | 2000-200099 A | | 7/2000 |
| JP | 2006053459 A | * | 2/2006 |
| JP | 2009-020218 A | | 1/2009 |
| WO | 2016/092807 A1 | | 6/2016 |
| WO | WO-2021013255 A1 | * | 1/2021 ........... H04L 9/3231 |

* cited by examiner

VOICE REGISTRATION DEVICE, CONTROL METHOD, PROGRAM, AND STORAGE MEDIUM

This application is a National Stage Entry of PCT/JP2020/028724 filed on Jul. 27, 2020, the contents of all of which are incorporated herein by reference, in their entirety.

TECHNICAL FIELD

The present disclosure relates to the technical field of a voice registration device, a control method, a program, and a storage medium for performing processing relating to voice registration.

BACKGROUND ART

Recently, in various devices such as a smart speaker and a vehicle navigation system, it has become possible to perform the operation of a device by recognizing the content of the utterance of the user using a voice recognition technology. In addition, with the popularization of the above technology, a speaker verification (voice authentication) system configured to not only recognize the content of the utterance but also determine whether or not "the speaker who spoke a voice registered in advance is identical to the speaker who has spoken the inputted voice this time" for the purpose of logging in to a service or personalization of a response to be more suitable for the user.

In order to use such a speaker verification system, the voice spoken by a target user is supposed to be registered using a voice registration system in the registration phase that is performed in advance, and then, speaker verification system determines whether or not the speaker that has spoken a newly inputted voice in the verification phase is identical to the target speaker that spoke the registered voice. Patent Literature 1 discloses a speaker verification system equipped with a registration phase and a verification phase.

CITATION LIST

Patent Literature

Patent Literature 1: WO2016/092807

SUMMARY

Problem to be Solved

In a case that the registration phase of the speaker verification system is carried out under a silent environment and that the verification phase is carried out under an environment with large background noise such as an environment along a railway line of trains, the shape of the vocal organ could change due to the Lombard effect in the verification phase. In this case, the features of the utterance by the speaker varies greatly to differ from the features of the registered voice, and therefore the verification accuracy of the speaker verification system could decrease.

In view of the issues described above, one object of the present invention is to provide a voice registration device, a control method, a program, and a storage medium capable of suitably performing a voice registration for verification.

Means for Solving the Problem

In one mode of the control device, there is provided a voice registration device including:

a noise reproduction means configured to reproduce noise data during a time period in which voice input from a user is performed;

a voice data acquisition means configured to acquire the voice data based on the voice input; and a voice registration means configured to register the voice data or data generated based on the voice data as data to be used for verification relating to a voice of the user.

In one mode of the control method, there is provided a control method executed by a computer, the control method including:

reproducing noise data during a time period in which voice input from a user is performed;

acquiring the voice data based on the voice input; and registering the voice data or data generated based on the voice data as data to be used for verification relating to a voice of the user.

In one mode of the program, there is provided a program executed by a computer, the program causing the computer to:

reproduce noise data during a time period in which voice input from a user is performed;

acquire the voice data based on the voice input; and register the voice data or data generated based on the voice data as data to be used for verification relating to a voice of the user.

BRIEF DESCRIPTION OF THE DRAWINGS

FIG. 12 illustrates the front view of a smartphone displaying the voice registration screen image immediately after logging in.

EXAMPLE EMBODIMENTS

Hereinafter, an example embodiment of a voice registration device, a control method, a program, and a storage medium will be described with reference to the drawings.

First Example Embodiment

(1) Functional Block

Figure 1:
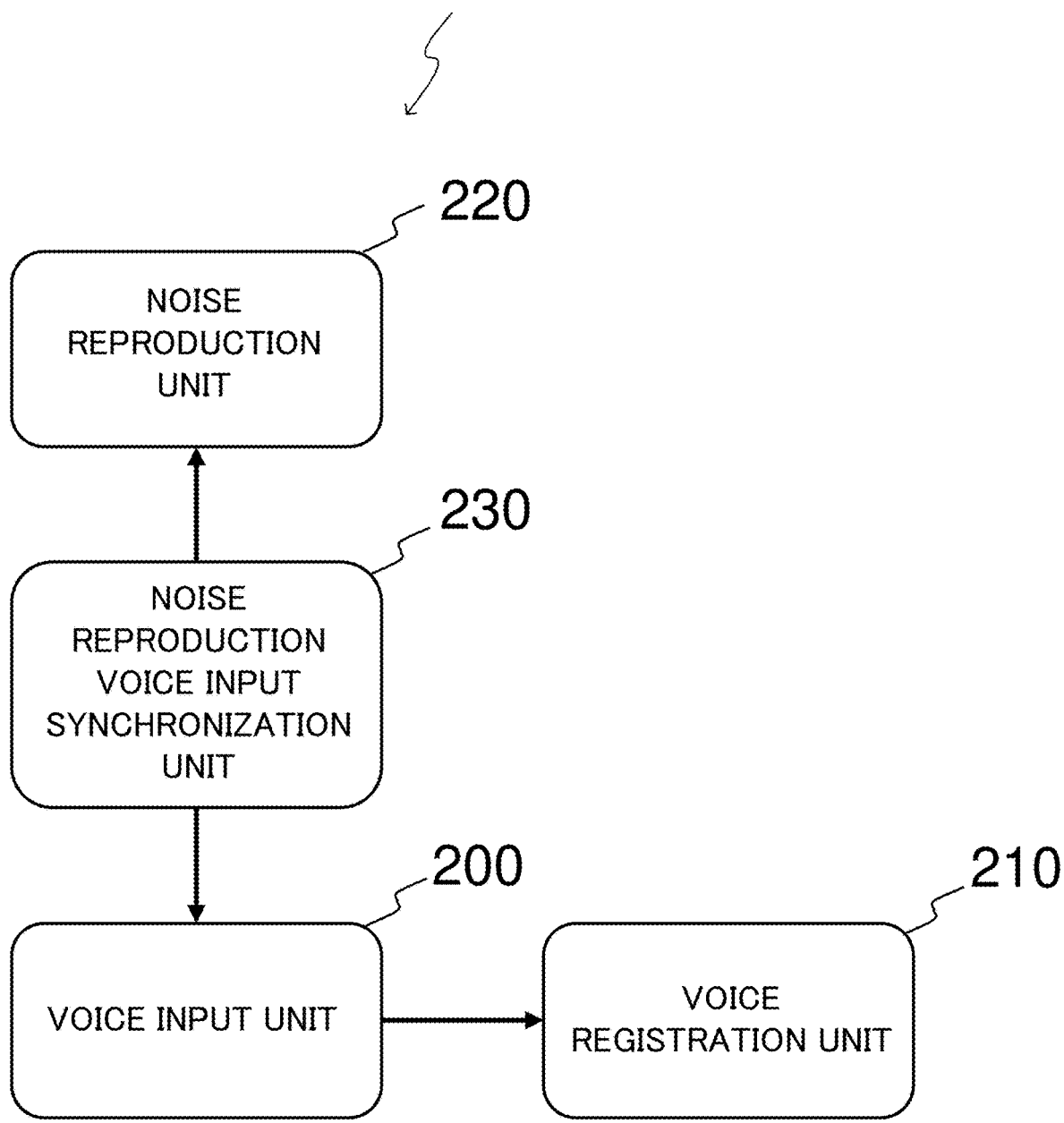
FIG. 1 is a block diagram showing a functional configuration of a voice registration device according to a first example embodiment.

FIG. 1 is a block diagram illustrating a functional configuration of a voice registration device 1 according to a first example embodiment. The voice registration device 1 is included in a speaker verification system configured to identify a speaker through verification of the voice and the voice registration device 1 performs the registration phase for registering the voice of a speaker to be used for the verification. In addition to the registration phase, the speaker verification system performs the verification phase for determining whether or not the speaker who has spoken the newly inputted voice is identical to the target speaker that spoke the voice registered in the registration phase.

The voice registration device 1 according to the first example embodiment functionally includes a voice input unit 200, a voice registration unit 210, a noise reproduction unit 220, and a noise reproduction voice input synchronization unit 230. In FIG. 1, any two blocks to exchange data with each other are connected by a solid line, but the combinations of the blocks to exchange data with each other is not limited to the combinations in FIG. 1. The same applies to other block diagrams described below.

The voice input unit 200 accepts a voice input from a user under the control of the noise reproduction voice input synchronization unit 230 and generates voice data representing the voice of the user. The voice registration unit 210 associates the voice data generated by the voice input unit 200 with the user identification information for identifying the user who uttered the voice, and registers, as data to be used for verification relating to the voice of the user, the voice data associated with the user identification information in a registered voice database (DB: DataBase).

Under the control of the noise reproduction voice input synchronization unit 230, the noise reproduction unit 220 performs noise reproduction during a time period (also referred to as "voice input period") in which the voice input by the voice input unit 200 is being performed. The term "time period" herein includes a time period with a short time length in seconds. The noise reproduction voice input synchronization unit 230 performs synchronization control of the voice input unit 200 and the noise reproduction unit 220. Specifically, the noise reproduction voice input synchronization unit 230 controls the noise reproduction unit 220 so that the noise reproduction unit 220 reproduces the noise during the voice input period. In other words, the noise reproduction voice input synchronization unit 230 controls the reproduction by the noise reproduction unit 220 so that the noise data is reproduced in synchronization with the voice input.

The voice registration device 1 may be configured by a plurality of devices. The voice input unit 200, the voice registration unit 210, the noise reproduction unit 220, and the noise reproduction voice input synchronization unit 230 may be realized by the voice registration device 1 configured by a plurality of devices. In this case, the plurality of devices constituting the voice registration device 1 exchange information necessary for executing the pre-allocated process with one another through wired or wireless direct communication or through a network communication.

In this case, the voice registration device 1 functions as a voice registration system.

(2) Hardware Configuration

Figure 2:
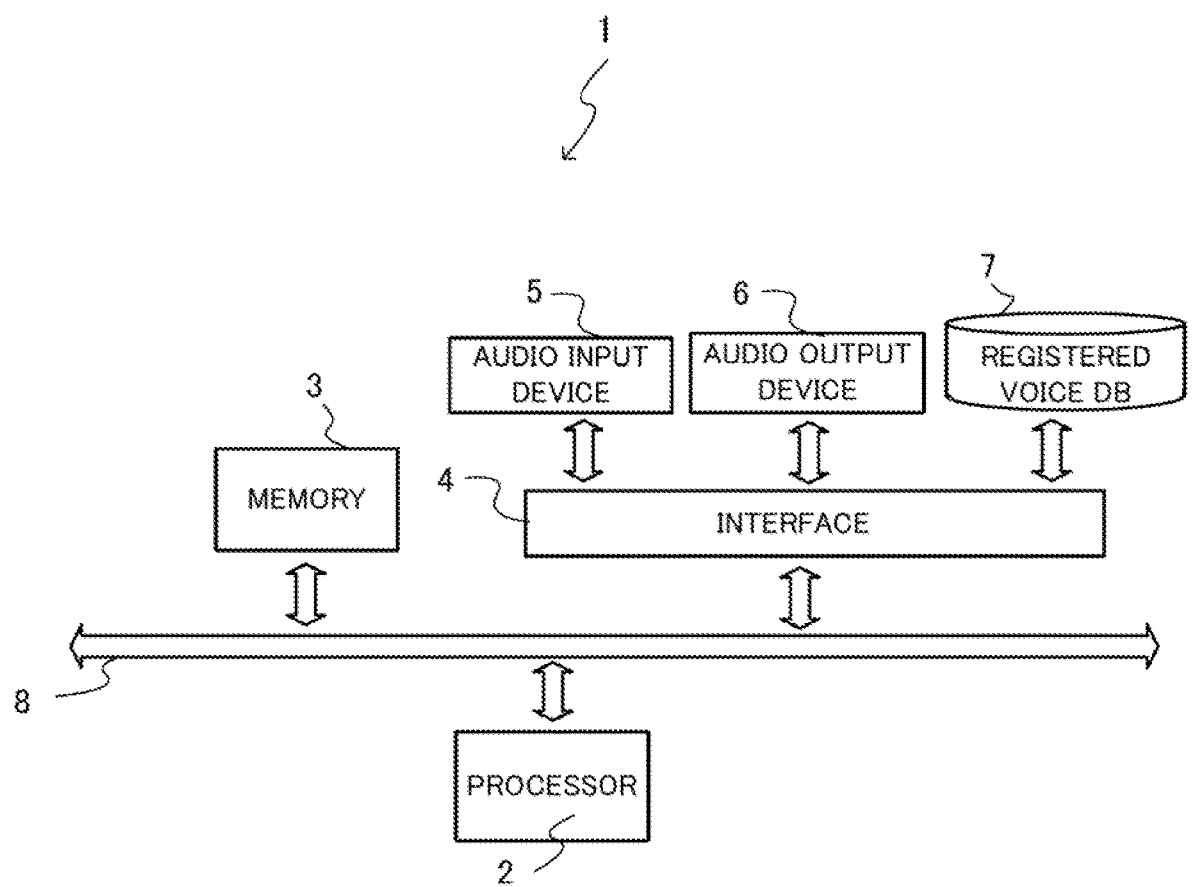
FIG. 2 illustrates an example of a hardware configuration of a voice registration device.

FIG. 2 is an example of a hardware configuration of a voice registration device 1 common to each example embodiment. The voice registration device 1 includes, as hardware, a processor 2, a memory 3, an interface 4, an audio input device 5, an audio output device 6, and a registered voice DB 7. The processor 2, the memory 3, and the interface 4 are connected to one another via a data bus 8.

The processor 2 functions as a controller (arithmetic device) configured to control the entire voice registration device 1 by executing a program stored in the memory 3. The processor 2 is one or more processors such as a CPU (Central Processing Unit), a GPU (Graphics Processing Unit), a TPU (Tensor Processing Unit), a FPGA (Field-Programmable Gate Array), an ASIC (Application Specific Integrated Circuit), and a quantum processor. The processor 2 may be configured by a plurality of processors. The processor 2 functions as a voice registration unit 210 and a noise reproduction voice input synchronization unit 230. Further, the processor 2 functions as the voice input unit 200 together with the audio input device 5, and functions as the noise reproduction unit 220 together with the audio output device 6. The processor 2 is also an example of a computer.

The memory 3 is configured by various volatile and non-volatile memories such as a RAM (Random Access Memory), a ROM (Read Only Memory), and a flash memory. In the memory 3, a program for executing a process performed by the voice registration device 1 is stored. Further, for example, the memory 3 stores various information necessary for the processing by the voice registration device 1 such as one or more records of noise data for reproducing noise and user identification information of a user that is a speaker. A part of the information stored in the memory 3 may be stored by one or more external storage devices that can communicate with the voice registration device 1, or may be stored by a storage medium removable from the voice registration device 1.

The interface 4 is one or more interfaces for electrically connecting the voice registration device 1 to other devices. Examples of the interface include a wireless interface for wirelessly exchanging data with other devices such as a network adapter, a hardware interface for connecting to other devices such as a cable. In the present example embodiment, the interface 4 performs an interface operation between the voice registration device 1 and any of the audio input device 5, the audio output device 6, and the registered voice DB 7. The audio input device 5 is, for example, a microphone which generates an electrical signal corresponding to a detected sound. The audio output device 6 is, for example, a speaker, and outputs a sound corresponding to the specified sound data under the control of the processor 2.

Under the control of the processor 2, the registered voice DB 7 stores the voice data generated during the voice input period by the audio input device 5 in association with the user identification information for identifying the speaker. The registered voice DB 7 is used in the verification phase, which uses the registered voice data to verify the speaker.

The verification phase may be executed by the voice registration device 1 or may be performed by any other device referring to the registered voice DB 7. The registered voice DB 7 may be stored in the memory 3 or stored in an external storage device capable of communicating with the voice registration device 1.

The hardware configuration of the voice registration device 1 is not limited to the configuration shown in FIG. 2. For example, the voice registration device 1 may further include an input device configured to receive an input other than a voice input (e.g., an input by a keyboard, a button, or a touch panel) and/or a display device such as a display and a projector.

Here, each component corresponding to the voice input unit 200, the voice registration unit 210, the noise reproduction unit 220, and the noise reproduction voice input synchronization unit 230 described in FIG. 1 can be realized, for example, by the processor 2 executing a program. Additionally, necessary programs may be recorded on any non-volatile storage medium and installed as necessary to realize each component. It should be noted that at least a portion of these components may be implemented by any combination of hardware, firmware, and software, or the like, without being limited to being implemented by software based on a program. At least some of these components may also be implemented using user programmable integrated circuit such as a FPGA (field-programmable gate array) and a microcontroller. In this case, the integrated circuit may be used to realize a program functioning as each of the above components. Further, at least a part of the components may be configured by an ASSP (Application Specific Standard Produce). Accordingly, each of the above-described components may be realized by various hardware. The above explanation is true for other example embodiments to be described later.

(3) Processing Flow

Figure 3:
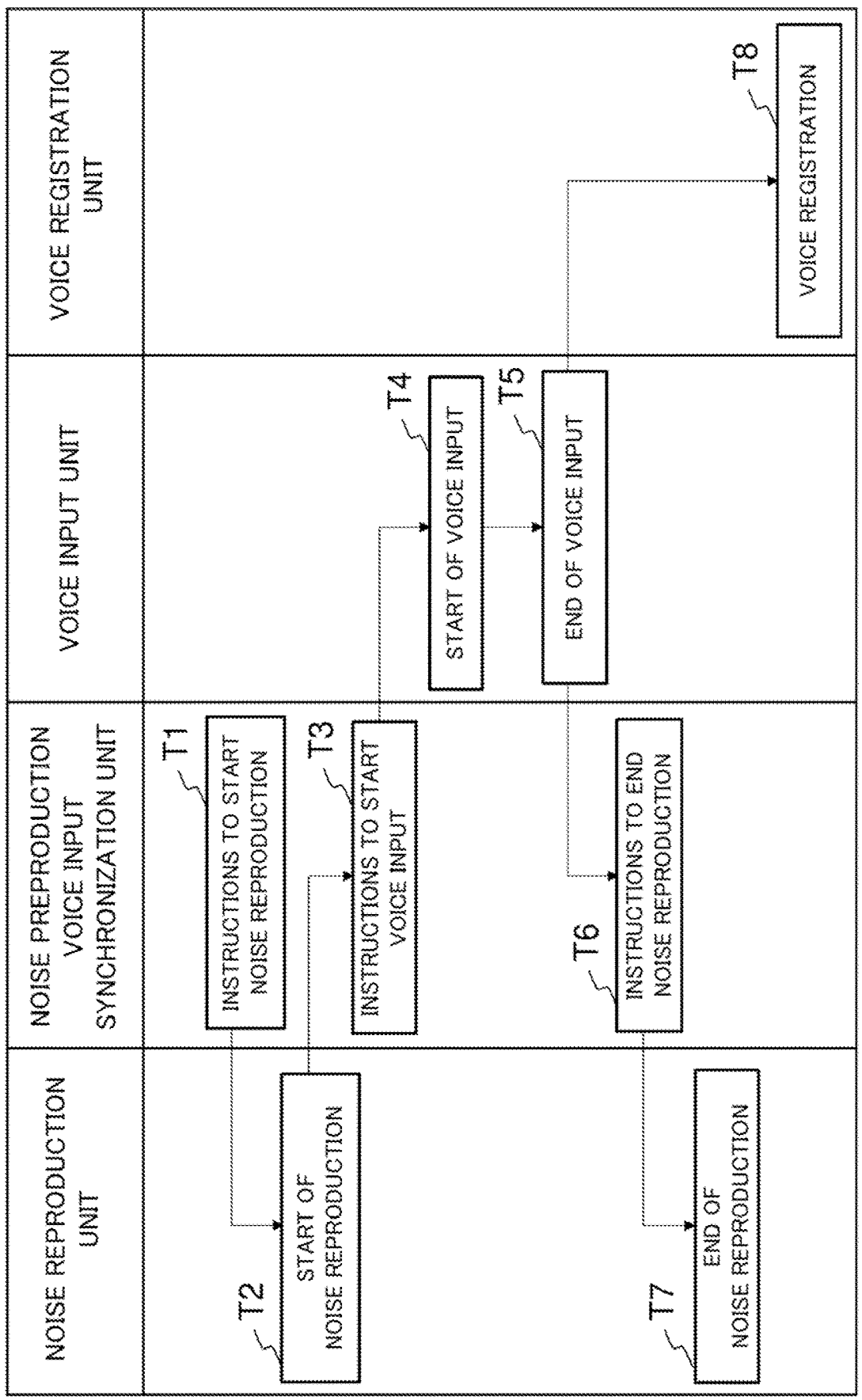
FIG. 3 is a diagram showing a processing flow to be executed by components of the voice registration device.

FIG. 3 is a diagram illustrating a processing flow to be executed by the components of the voice registration device 1 shown in FIG. 1. The voice registration device 1 executes the processing flow shown in FIG. 3 for each record of the voice registration per one user.

First, the noise reproduction voice input synchronization unit 230 gives instructions to start a noise reproduction to the noise reproduction unit 220 (step T1). Then, the noise reproduction unit 220 starts to reproduce the noise in accordance with the above-mentioned instructions to start the noise reproduction (step T2).

Next, the noise reproduction voice input synchronization unit 230 gives instructions to start voice input to the voice input unit 200 (Step T3). The voice input unit 200 starts the input of the voice of the user in accordance with the above-mentioned instructions to start voice input (step T4).

Thereafter, the voice input unit 200 detects the end timing of the voice input and completes the voice input (step T5). In this case, for example, the voice input unit 200 determines the end timing of the voice input to be the timing of detecting a predetermined keyword by voice recognition from the input voice data or the timing of detecting a predetermined user input such as a selection of the speech end button provided in advance. Then, the voice input unit 200 supplies the noise reproduction voice input synchronization unit 230 with a completion notification of the voice input.

When the noise reproduction voice input synchronization unit 230 receives the completion notification of the voice input, it gives instructions to end the noise reproduction to the noise reproduction unit 220 (step T6). The noise reproduction unit 220 completes the reproduction of noise in accordance with the instructions to end the noise reproduction (step T7).

The voice data of the user inputted by the voice input unit 200 during the time period between the start of the voice input and the end of the voice input is supplied to the voice registration unit 210, and the voice registration unit 210 registers the voice data in the registered voice DB 7 in association with the user identification information (step T8). At this time, instead of registering the voice data generated by the voice input device 5 as it is, the voice registration unit 210 may extract the speaker feature values for identifying the speaker and register feature data indicating the extracted speaker feature values in the registered voice DB 7. Hereinafter, voice data to be registered in association with the user identification information in the registered voice DB 7 or voice data used for calculating the feature data is also referred to as "registered voice".

(4) Effect According to First Example Embodiment

Next, a description will be given of the effect according to the first example embodiment.

In the first example embodiment, the voice registration device 1 is configured to reproduce noise during user's voice input. Thus, it can be expected that the voice which caused deformation of the pronunciation due to the Lombard effect is registered in the registered voice DB 7 in which the voice registration device 1 registers the user voice for verification. Therefore, in the verification phase of the speaker verification system using the voice registered by using the voice registration device 1 according to the first example embodiment, it is possible to improve the accuracy of the speaker verification even under the noise environment.

Figure 4:
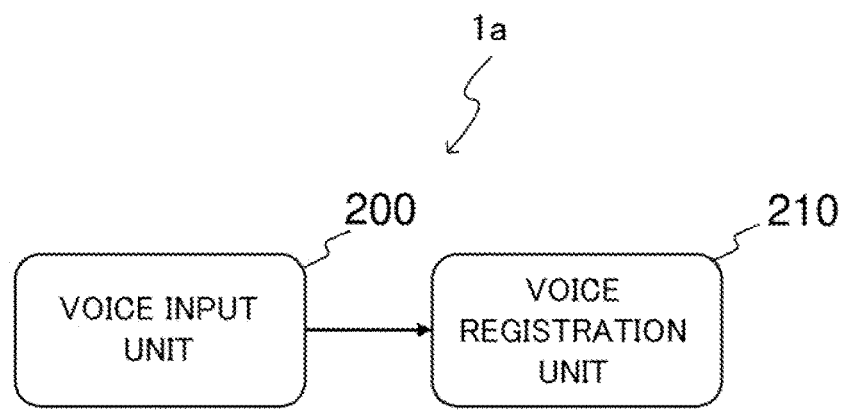
FIG. 4 illustrates a configuration example of a voice registration device according to a comparative example in which noise reproduction is not performed at the time of voice input of a user.

Next, the effect of the voice registration device 1 according to the first example embodiment will be supplementally described with reference to a comparative example in which noise reproduction is not performed at the time of inputting user's voice. FIG. 4 shows a configuration example of a voice registration device 1a according to a comparative example in which noise reproduction is not performed at the time of inputting user's voice. The voice registration device 1a includes a voice input unit 200 and a voice registration unit 210, which correspond to a part of components of the voice registration device 1 shown in FIG. 1.

Figure 5:
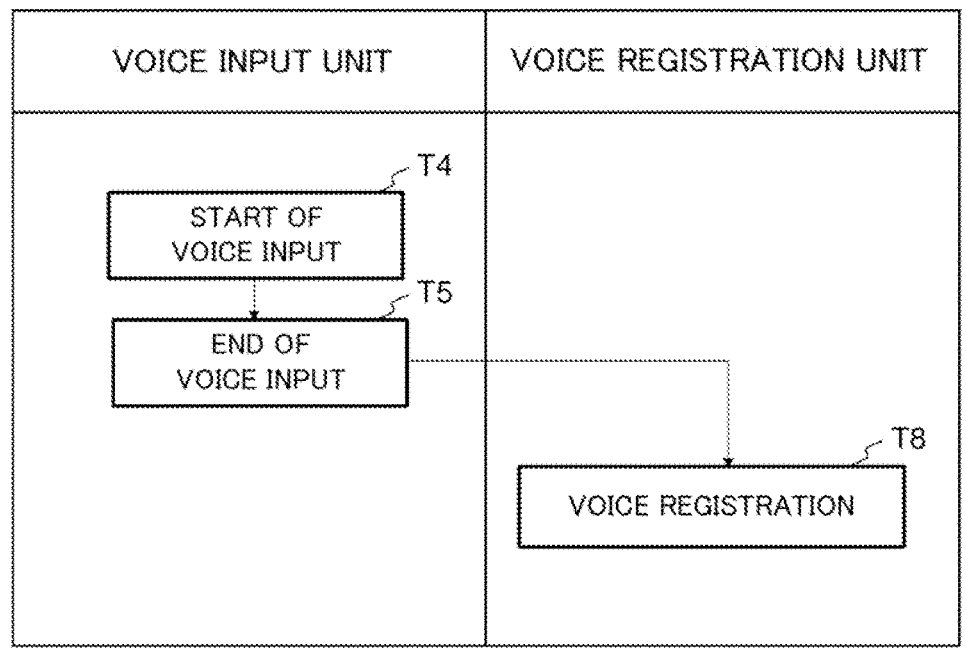
FIG. 5 is a diagram showing a processing flow to be executed by components of the voice registration device according to the comparative example.

FIG. 5 is a diagram illustrating a flowchart of the process to be executed by the components of the voice registration device 1a. The voice registration device 1a executes process corresponding to a part of the process indicated by the flowchart shown in FIG. 3 to be executed by the voice registration device 1. Specifically, the voice input unit 200 starts the voice input from the user (step T4). The voice input unit 200 determines the timing of ending the voice input by automatically detecting a keyword or by accepting an input of a speech end button from the user, and completes the voice input (step T5). The voice data of the user inputted by the voice input unit 200 during the period between the start of the voice input and the end of the voice input is supplied to the voice registration unit 210, and the voice registration unit 210 registers the voice data together with the user identification information in the registered voice DB (step T8). At this time, instead of registering the input voice data as it is, the voice registration unit 210 may extract speaker feature values for identifying the speaker and register the speaker feature data.

Accordingly, in the configuration of the comparative example, the registration phase of the speaker verification system is performed under silent environment. In this case, when the verification phase for verifying the speaker using the registered voice data is carried out under such environment with large background noise, such as environment along train lines, a phenomenon (so-called Lombard effect) in which the user unconsciously raises the volume of the voice so as not to be buried in the noise occurs. In this case, the shape of the phonation organ changes, that is, the voice feature of the speaker changes and becomes greatly different from the registered voice, and therefore the verification accuracy of the speaker verification system in the verification phase could decrease.

Taking the above issues into consideration, the voice registration device 1 according to the first example embodiment reproduces noise at the time of inputting the voice of a user in the registration phase, and thereby can suitably prevent the decrease in the accuracy of the speaker verification due to the Lombard effect under the noise environment in the verification phase. That is, by registering the voice with the deformation of pronunciation due to the Lombard effect in the registration phase, it is possible to perform, in the verification phase, the verification between the voices generated under the Lombard effect. As a result, it is possible to suitably decrease the difference between the voices due to the deformation of pronunciation thereby to improve the accuracy of the verification.

Second Example Embodiment

Figure 6:
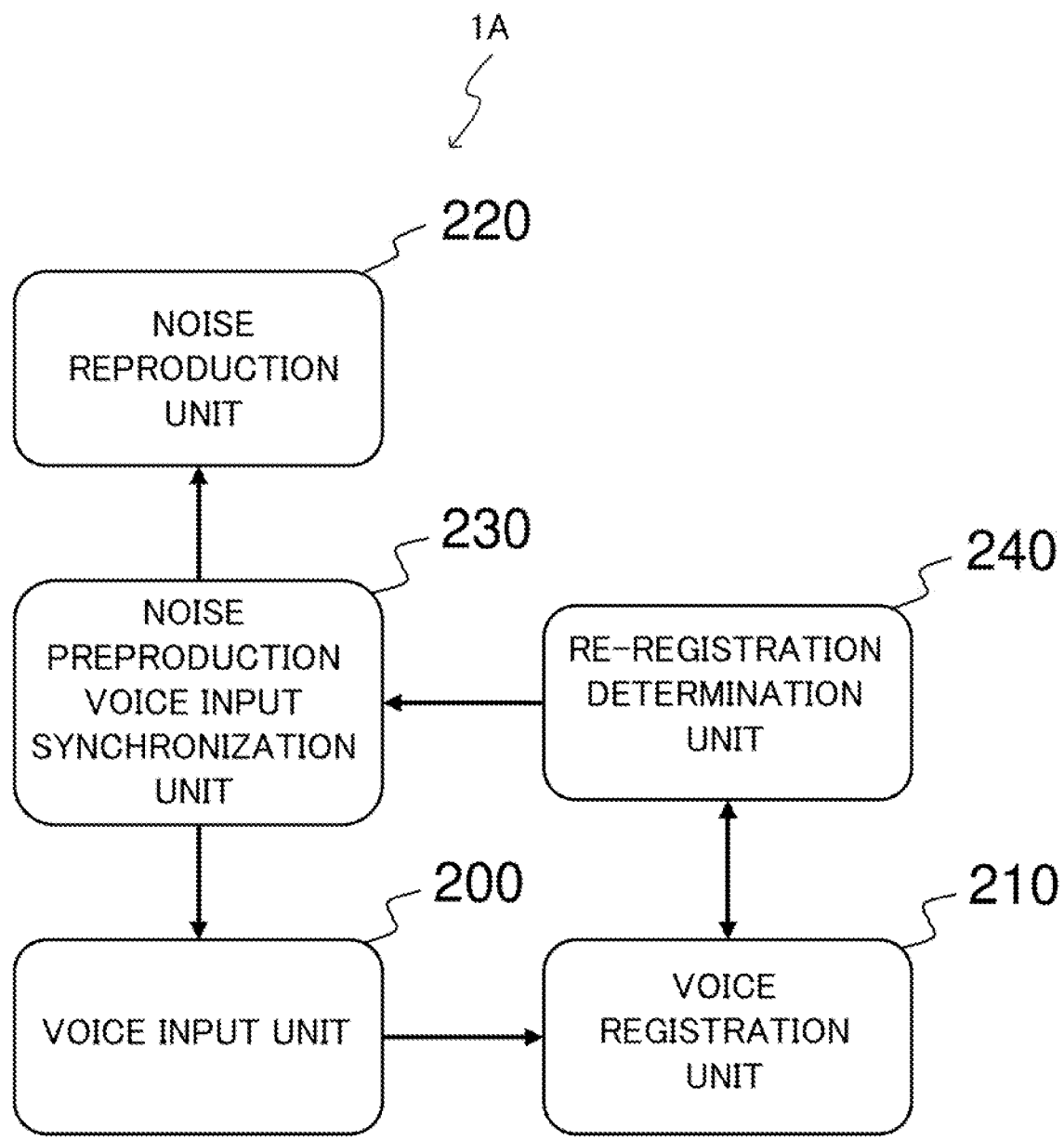
FIG. 6 is a functional block diagram of the voice registration device in a second example embodiment.

FIG. 6 is a functional block diagram of the voice registration device 1A according to the second example embodiment. The voice registration device 1A according to the second example embodiment differs from the voice registration device 1 according to the first example embodiment in that the voice registration process is repeated until a sufficient deformation of pronunciation occurs. Hereafter, components of the voice registration device 1A according to the second example embodiment same as in the voice registration device 1 according to the first example embodiment will be appropriately denoted by the same reference numerals as in the first example embodiment, and the explanation thereof will be omitted.

As shown in FIG. 6, the voice registration device 1A includes a re-registration determination unit 240. The re-registration determination unit 240 determines whether or not (that is, whether or not the voice data is appropriate to be registered) the voice data needs to be re-acquired based on the comparison result between the voice data of a speaker generated by the voice input unit 200 in the voice input period and the registered voice data (also referred to as "silent environment voice data") uttered by the same speaker in the silent environment. The silent environment voice data is previously stored in the registered voice DB 7 in association with, for example, the user identification information of the speaker.

The re-registration determination unit 240 makes the voice registration unit 210 register the voice data generated by the voice input unit 200 in the registered voice DB 7 when the re-registration determination unit 240 determines that the deformation of pronunciation has occurred through the above-described comparison. For example, the re-registration determination unit 240 determines that the deformation of pronunciation has occurred if the feature distance between the voice data generated by the voice input unit 200 and the silent environment voice data is larger than a predetermined threshold value. The above-described feature distance is, for example, a distance (difference) in the feature space of the speaker feature values. A specific example of determination by the re-registration determination unit 240 will be specifically described in the section [Second Example] to be described below. Instead of calculating the feature distance, the re-registration determination unit 240 may determine the presence or absence of the deformation of the pronunciation based on the degree of similarity or the like calculated by directly comparing the voice data generated by the voice input unit 200 with the silent environment voice data by use of the cross-correlation function or the like.

On the other hand, when the re-registration determination unit 240 determines, through the above-described comparison, that the deformation of the pronunciation has not occurred, the re-registration determination unit 240 determines that the re-acquisition of the voice input is necessary and provides a voice input period again thereby to perform the voice input again. For example, the re-registration determination unit 240 determines that the deformation of the pronunciation has not occurred when the feature distance between the voice data generated by the voice input unit 200 and the silent environment voice data is equal to or less than a predetermined threshold value.

Preferably, when it is determined that re-acquisition of the voice input is necessary, the re-registration determination unit 240 may instruct the noise reproduction voice input synchronization unit 230 to add instructions to change parameters of the noise reproduction unit 220 to the instructions to start the noise reproduction. Specifically, for example, the re-registration determination unit 240 generates, as the above-mentioned instructions to change the parameters, instructions to raise the noise volume by a predetermined degree or by a predetermined rate and/or to change the type of the noise (i.e., change the noise data to be reproduced).

Figure 7:
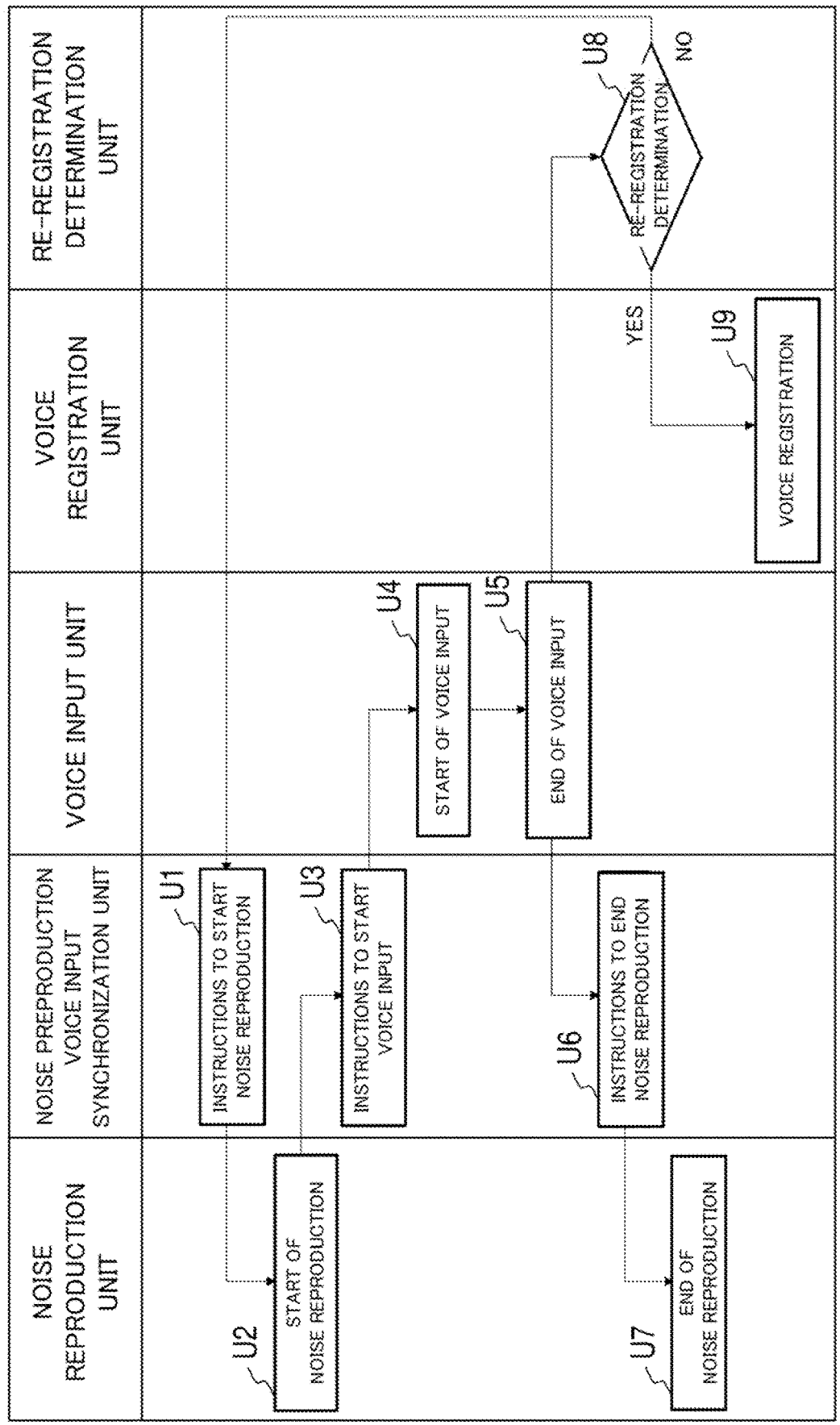
FIG. 7 is a diagram illustrating a processing flow to be executed by components of the voice registration device according to the second example embodiment.

FIG. 7 is a diagram illustrating a process flow to be executed by components of the voice registration device 1A according to the second example embodiment. The voice registration device 1A executes the process flow shown in FIG. 7 for each record of the voice registration per one user. Since the process at step U1 to step U4 in FIG. 7 is the same as the process at step T1 to step T4 in FIG. 3 described in the first example embodiment, the description thereof will be omitted.

After terminating the voice input in accordance with the detection of the end timing of the voice input at step U5, the voice input unit 200 supplies the generated voice data to the re-registration determination unit 240 through the voice registration unit 210. In the same way as the process at step T6, the noise reproduction voice input synchronization unit 230 gives instructions to end the noise reproduction to the noise reproduction unit 220 (step U6), and the noise reproduction unit 220 ends the noise reproduction on the basis of the instructions to end the noise reproduction (step U7).

After the process at step U5, the re-registration determination unit 240 makes a determination on whether or not to re-register the voice data by comparing the voice data of a speaker generated by the voice input unit 200 with the registered silent environmental voice data of the speaker (step U8). Then, the re-registration determination unit 240 determines that it is necessary to re-register the voice data since the difference between the inputted voice data and the silent environmental voice data exceeds a predetermined threshold value due to the deformation of pronunciation (step U8; Yes), it supplies the voice data to the voice registration unit 210 and causes the voice registration unit 210 to register the voice data in the registered voice DB 7 (step U9).

On the other hand, when the re-registration determination unit 240 determines that it is not necessary to re-register the voice data since the difference between the inputted voice data and the silent environmental voice data does not exceed the predetermined threshold value due to the deformation of pronunciation (step U8; No), it causes the noise reproduction voice input synchronization unit 230 to give the instructions to not only start the noise reproduction instruction but also change the parameter of the noise reproduction to the noise reproduction unit 220 (step U1). Thereafter, the process at step U2 and the following processes are re-executed.

As described above, the voice registration device TA according to the second example embodiment repeats the voice registration process until sufficient deformation of pronunciation occurs. Thus, in the verification phase using registered voice, improvement of the accuracy of the speaker verification under noise environment for various speakers can be achieved.

Third Example Embodiment

Figure 8:
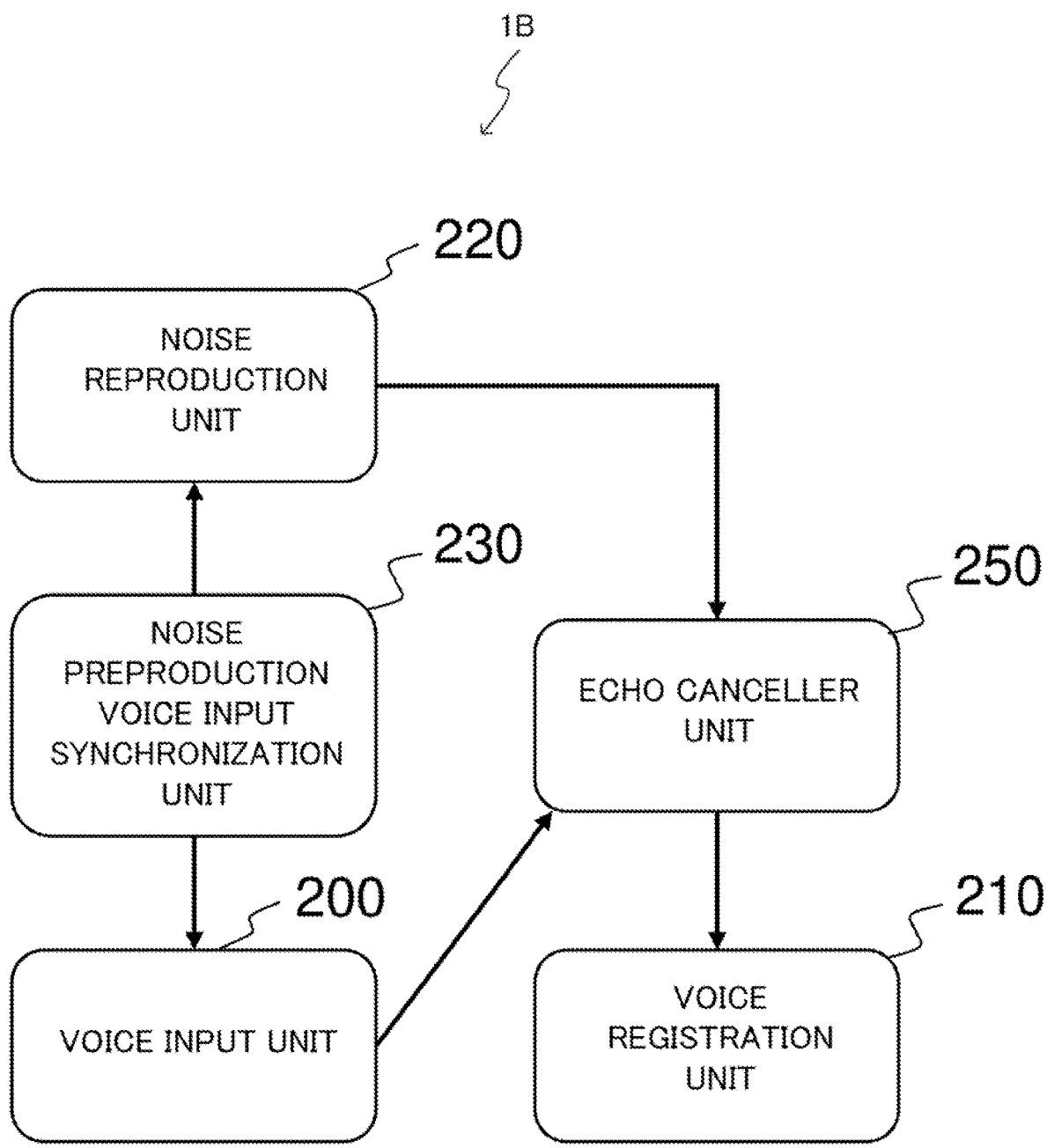
FIG. 8 is a functional block diagram of the voice registration device according to a third example embodiment.

FIG. 8 is a functional block diagram of the voice registration device 1B according to the third example embodiment. The voice registration device 1B according to the third example embodiment differs from the voice registration device 1 according to the first example embodiment in that the signal-to-noise ratio of the registered voice is improved by removing the noise due to the reproduction by the noise reproduction unit 220 using an echo canceller. Hereafter, the same components of the voice registration device 1B in the third example embodiment as the components of the voice registration device 1 in the first example embodiment will be appropriately denoted by the same reference numerals, and the explanation thereof will be omitted.

As shown in FIG. 8, the voice registration device 1B includes an echo canceller unit 250. The echo canceller unit 250 generates voice data in which the reproduction noise is removed by applying the echo canceller to the voice data generated by the voice input unit 200. Then, the echo canceller unit 250 supplies the voice data after the application of the echo canceller to the voice registration unit 210, and the voice registration unit 210 registers the voice data after the application of the echo canceller in the registered voice DB 7 in association with the user identification information. Instead of registering the voice data after the application of the echo canceller in the registered voice DB 7, the voice registration unit 210 may register the feature data indicating the speaker feature values of the voice data after the application of the echo canceller in the registered voice DB 7.

Figure 9:
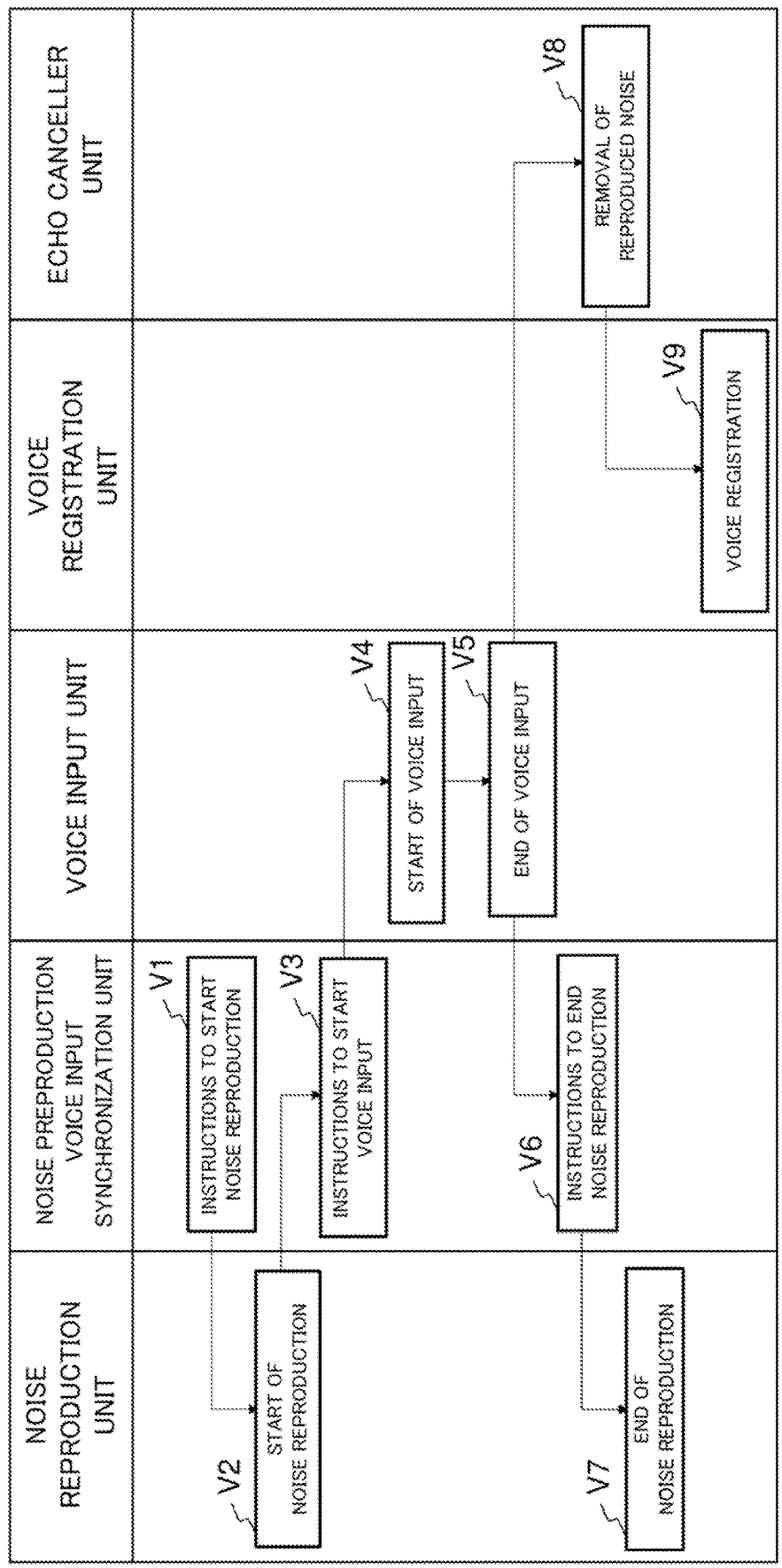
FIG. 9 is a diagram illustrating a processing flow to be executed by components of the voice registration device according to the third example embodiment.

FIG. 9 is a diagram illustrating a process flow to be executed by the components of the voice registration device 1B according to the third example embodiment. The voice registration device 1B executes the process flow shown in FIG. 9 for each record of the voice registration per a single user. Since the processes at step V1 to step V4 in FIG. 9 is the same as the processes at step T1 to step T4 in FIG. 3 described in the first example embodiment, the description thereof will be omitted.

The voice input unit 200 detects the end timing of the voice input at step V5, and supplies the generated voice data to the echo canceller unit 250 through the voice registration unit 210 after the end of the voice input. In the same as the process at step T6, the noise reproduction voice input synchronization unit 230 gives instructions to end the noise reproduction to the noise reproduction unit 220 (step V6), and the noise reproduction unit 220 ends the noise reproduction on the basis of the instructions to end the noise reproduction (step V7).

After the process at step V5, the echo canceller unit 250 applies an echo canceller to the voice data generated by the voice input unit 200 to remove the reproduction noise (step V8). Here, since it is considered that the voice data generated by the voice input unit 200 is recorded together with the noise data used by the noise reproduction unit 220, the noise component caused by the noise reproduction in the noise reproduction unit 220 is added thereto. Therefore, the echo canceller unit 250 applies the echo canceller to the voice data to thereby generate the voice data from which the noise at the time of noise reproduction is suitably removed. Thereafter, in the same way as in the first example embodiment, the voice registration unit 210 registers the voice data that has been denoised or the feature data indicating the speaker feature values thereof in the registered voice DB 7 in association with the user identification information (step V9).

The voice registration device 1B according to the third example embodiment can improve the signal-to-noise ratio of the registered voice by using an echo canceller. Thus, in the verification phase of the speaker verification system which uses the registered voice DB 7 generated or updated by the voice registration device 1B according to the third example embodiment, the accuracy of the speaker verification can be improved even in various types of noise environments including a silent environment.

Fourth Example Embodiment

Figure 10:
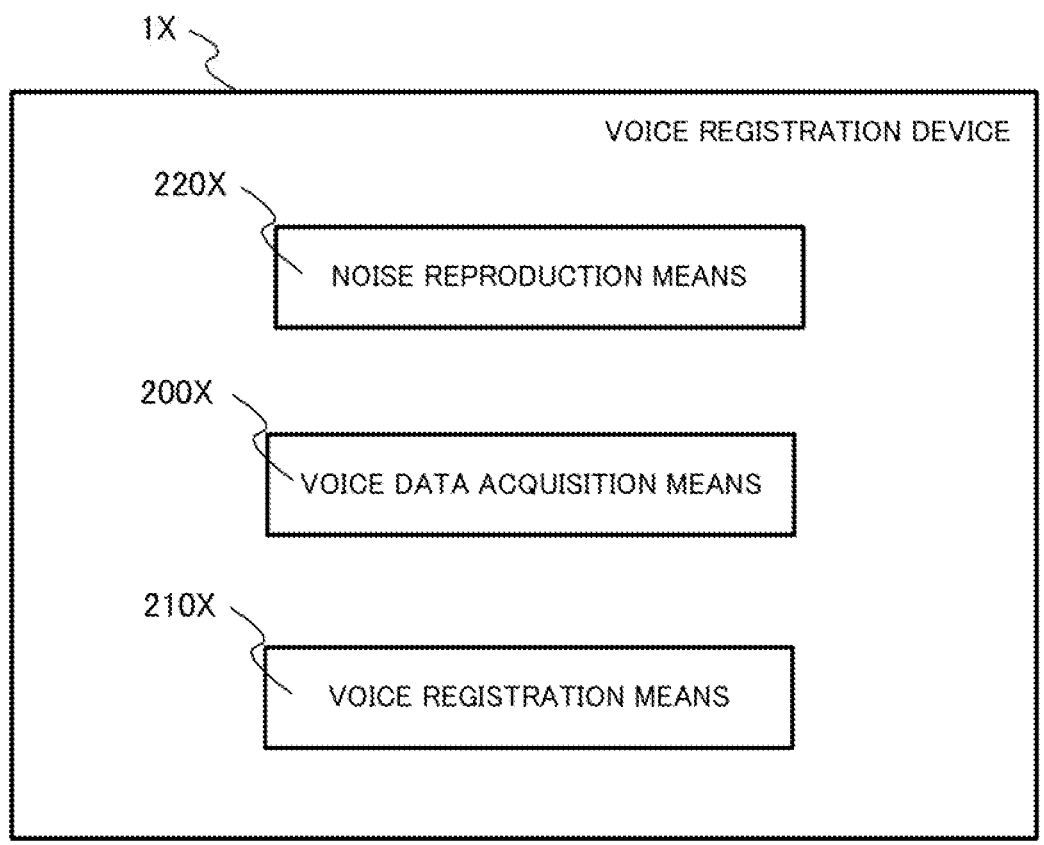
FIG. 10 is a schematic configuration diagram of the voice registration device according to a fourth example embodiment.

FIG. 10 is a schematic configuration diagram of a voice registration device 1X according to the fourth example embodiment. The voice registration device 1X mainly includes a noise reproduction means 220X, a voice data acquisition means 200X, and a voice registration means 210X. The voice registration device 1X may be configured by a plurality of devices. Examples of the voice registration device 1X include the voice registration device 1, the voice registration device 1A, and the voice registration device 1B according to the first to third example embodiments.

The noise reproduction means 220X is configured to reproduce noise data during a time period in which voice input from a user is performed. Examples of the mode to "reproduce noise data" herein include not only such a mode in which the noise reproduction means 220X by itself outputs the noise but also such a mode in which the noise reproduction means 220X transmits the reproduction signal of the noise data to any other component in the voice registration device 1X or an external device so that the noise based on the noise data is outputted. Examples of the noise reproduction means 220X include the noise reproduction unit 220 according to any of the first example embodiment to the third example embodiment.

The voice data acquisition means 200X is configured to acquire the voice data based on the voice input. Examples of the mode to "acquire the voice data" herein include not only such a mode in which the voice data acquisition means 200X by itself generates the voice data, but also such a mode in which the voice data acquisition means 200X acquires the voice data generated by any other device. Examples of the voice data acquisition means 200X include the voice input unit 200 according to any of the first example embodiment to the third example embodiment.

The voice registration means 210X is configured to register the voice data or data generated based on the voice data as data to be used for verification relating to a voice of the user. The location (database) where the data to be used for the verification is registered is not limited to the memory of the voice registration device 1X and it may be a storage device other than the voice registration device 1X. Examples of the voice registration means 210X include the voice registration unit 210 according to any of the first example embodiment to the third example embodiment.

Figure 11:
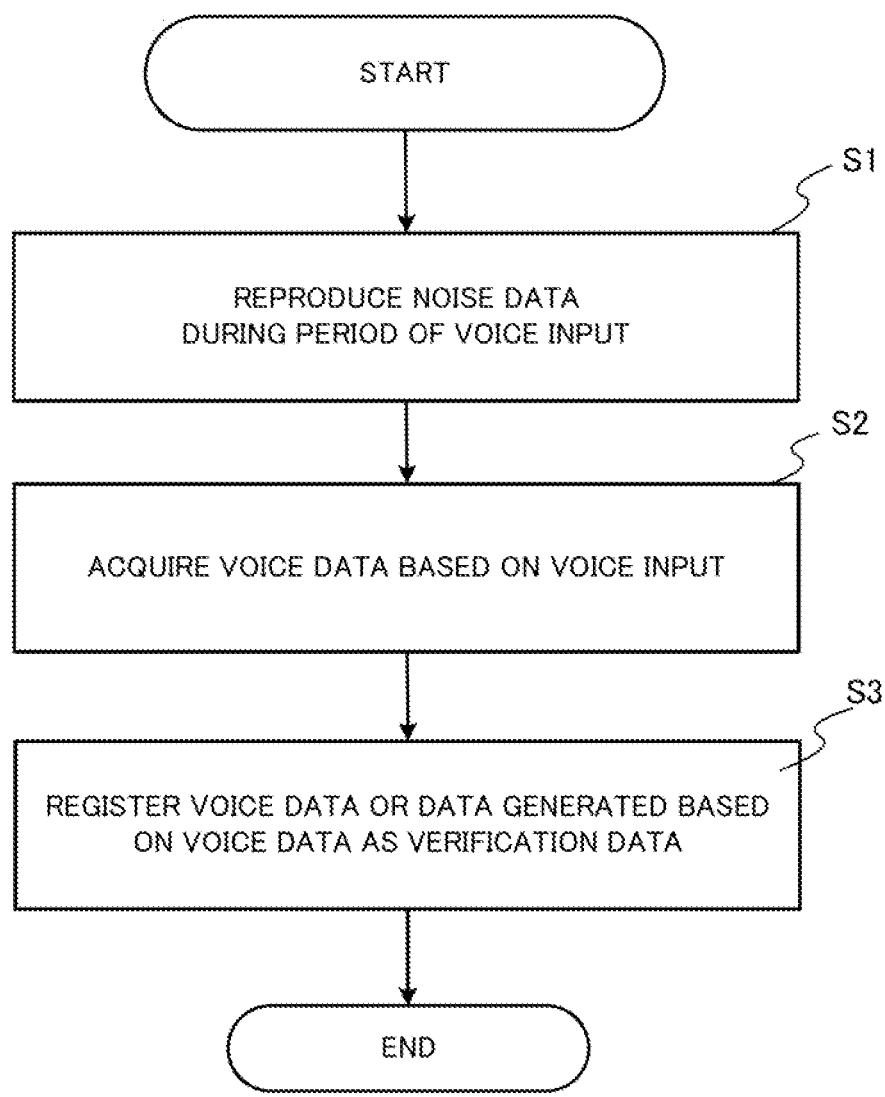
FIG. 11 illustrates an example of a flowchart to be executed by the voice registration device according to the fourth example embodiment.

FIG. 11 is an example of a flowchart to be executed by the voice registration device 1X in the fourth example embodiment. First, the noise reproduction means 220X reproduces noise data during a time period in which voice input from a user is performed (step S1). The voice data acquisition means 200X acquires the voice data based on the voice input (step S2). The voice registration means 210X registers the voice data or data generated based on the voice data as data to be used for verification relating to a voice of the user (step S3).

According to the fourth example embodiment, the voice registration device 1X reproduces the noise at the time of inputting the voice of the user in the registration phase, and therefore can suitably prevent the decrease in the accuracy of the speaker verification due to the Lombard effect in a noise environment in the verification phase.

EXAMPLES

Next, specific examples (first example and second example) relating to the first to fourth example embodiments will be described.

First Example

A smartphone 500 in which a voice registration program is implemented performs voice input and voice output using a microphone and a speaker built in the smartphone 500. In this case, the smartphone 500 is an example of the voice registration device according to any one of the first example embodiment to the fourth example embodiment. The voice registration program is pre-installed on the smartphone.

First, when logging in to the voice registration program through any authentication method other than voice verification (e.g., authentication by login ID and password), the smartphone 500 displays a GUI (Graphical User Interface) and starts the registration phase according to any one of the first example embodiment to the fourth example embodiment.

Specifically, the smartphone 500 displays the voice registration screen image with a "voice registration start icon" on the basis of the voice registration program, and when it detects that the "voice registration start icon" is selected, the noise reproduction unit 220 outputs the reproduced noise from the speaker. After the noise reproduction starts normally, it starts recording by the microphone and display such a message "Speak HIRAKE GOMA" on the voice registration screen image to accept the voice input from the user. The text of this message is exemplary and may not be any other text. It is not necessarily a fixed key phrase. Further, in order to easily cause the Lombard effect at this time, it may display a volume meter indicating the volume of the voice inputted to the microphone while changing the color of the volume meter in the case of detecting a volume above a certain level.

In addition, the smartphone 500 displays the "end of speaking icon" at the standby time. When detecting the end of the user's speaking by detecting user's tapping of the icon or by automatically detecting a keyword "HIRAKE GOMA" from the user's utterance, it ends the noise reproduction by the speaker.

Figure 12:
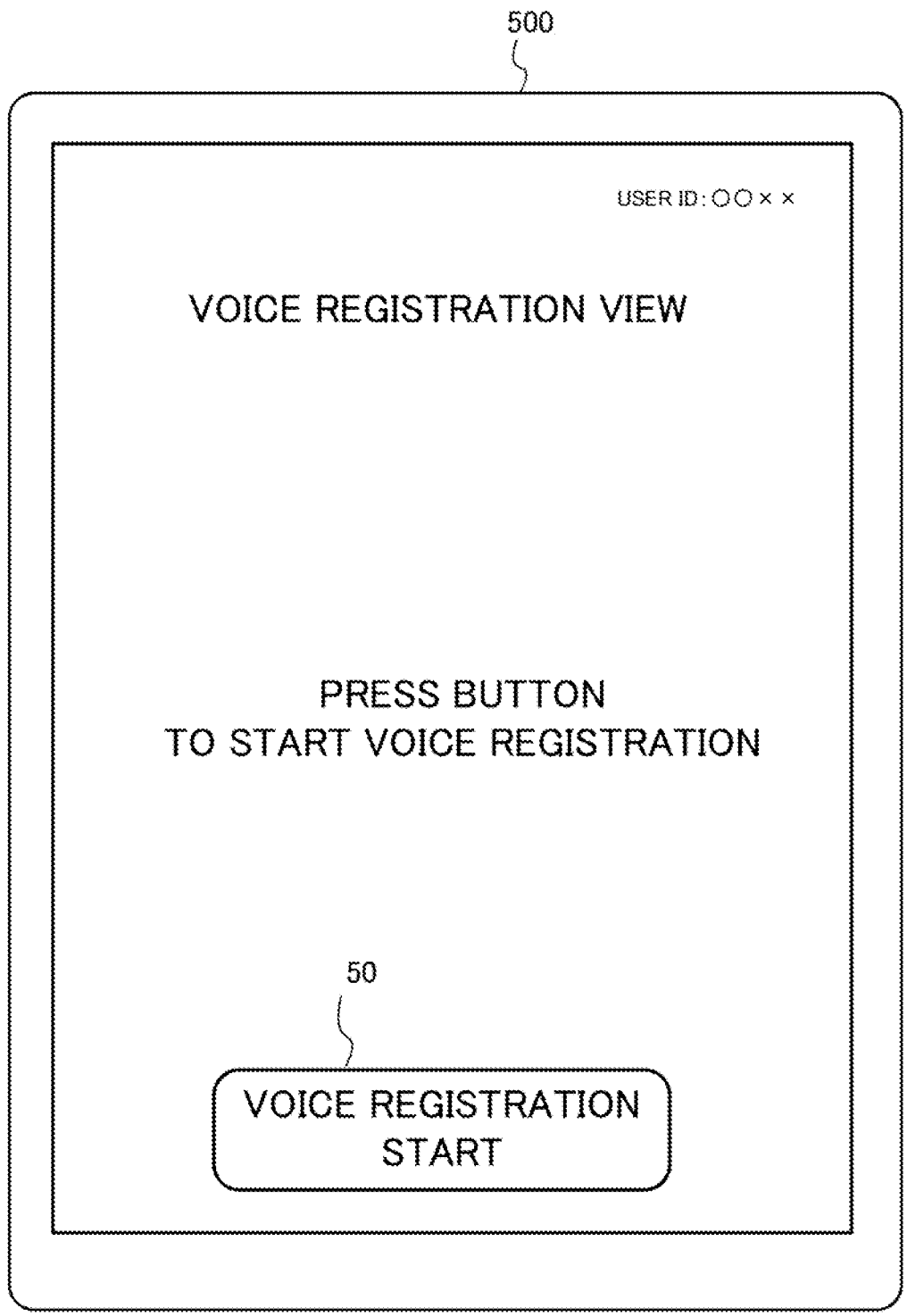
Figure 13:
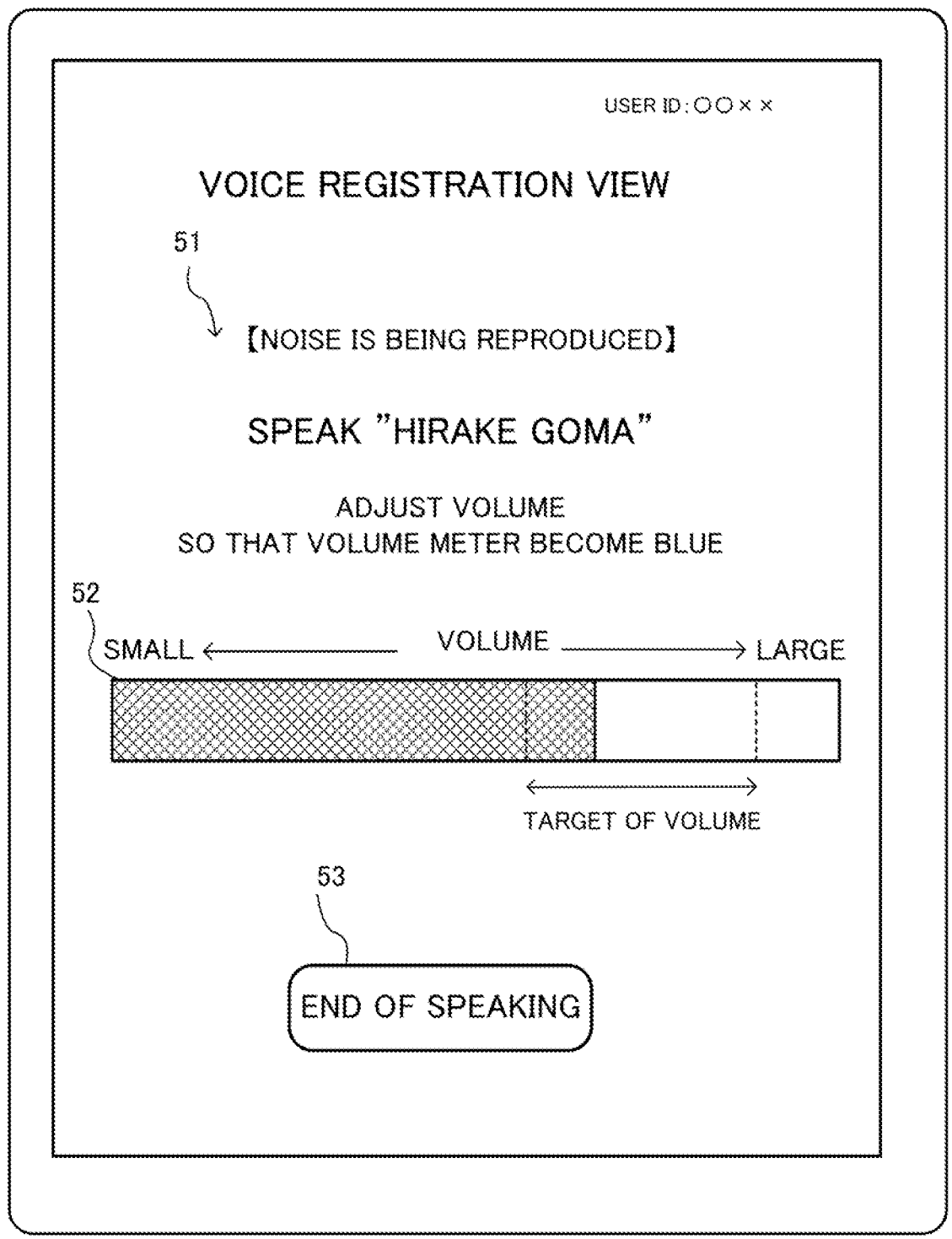
FIG. 13 illustrates the front view of the smartphone displaying the voice registration screen image after selecting the voice registration start icon.

FIG. 12 shows a front view of the smartphone 500 displaying the voice registration screen image immediately after logging in. FIG. 13 shows a front view of the smartphone 500 displaying the voice registration screen image after selecting the voice registration start icon.

In FIG. 12, after the user login authentication, the smartphone 500 displays a voice registration screen image including a voice registration start icon 50. The smartphone 500, when detecting that the voice registration start icon 50 is selected, displays the voice registration screen image shown in FIG. 13. The voice registration screen image shown in FIG. 13 includes a message 51 for voice registration, a volume meter 52, and an end-of-speaking icon 53.

The smartphone 500 displays the message 51 that includes: a notification indicating that the noise is being reproduced; instructions to speak a predetermined keyword; and instructions related to the volume of the utterance, respectively. In addition, the smartphone 500 changes the meter length and/or the color of the volume meter 52 according to the volume of the inputted voice. Here, the smartphone 500 sets the color of the volume meter 52 to blue when the volume of the voice is within the range of the target volume, and sets the color of the volume meter 52 to a color (for example, red) other than blue when the volume of the voice is not within the range of the target volume. The target volume is determined in advance to be the range of the volume in which the Lombard effect is likely to occur (and the range in which no sound cracking occurs), and is stored in a memory or the like of the smartphone 500. As described above, the smartphone 500 determines the display mode of the volume meter 52 based on whether or not the volume of the inputted voice is within the range of the target volume. Thereby, it is possible to present, to the user, information serving as a guide of the appropriate volume at the time of inputting the voice.

When detecting that the end-of-speaking icon 53 is selected, the smartphone 500 stores, in the registered voice DB 7, the inputted voice data or the feature data indicating the feature values of the inputted voice data in association with the user ID used for logging in to the voice registration program.

Here, the smartphone 500 may convert the inputted voice into feature values, wherein the examples of the feature values include time-series acoustic feature values such as MFCC (Mel-Frequency Cepstral Coefficients), an utterance feature values such as i-vector, and a speaker feature values obtained by extracting bottleneck feature values of a neural network learned for speaker identification. In addition, the smartphone 500 may perform a process such as averaging normalization, LDA (Linear Discriminant Analysis), and norm normalization after extracting the feature values. In this case, the smartphone 500 stores, in the registered voice DB 7, the data obtained by the above-described process in association with the user ID used for logging in to the voice registration program.

It may be better to register not only the voice generated in a noisy environment but also the voice generated in a silent environment. In this case, the smartphone 500 may perform the above-described noise reproduction only at the second and subsequent registrations of the user voice (i.e., after a voice registration under the silent environment). In this case, in the second and subsequent registration, the smartphone 500 may perform the process to be executed by the re-registration determination unit 240 described in the second example embodiment using the voice data registered at the first registration under the silent environment. Further, the smartphone 500 may accept the user setting regarding the presence or absence of noise reproduction and perform the above-described noise reproduction only when the noise reproduction is necessary according to the user setting.

In the verification phase of the voice verification system, the voice verification system (for example, the smartphone 500) accepts the input of the verification voice from the user by performing the same process as the process in the registration phase except for the noise reproduction. Thereby, the voice verification system obtains a verification voice or feature values of the verification voice which are used to be matched with the data registered in the registered voice DB 7. The voice verification system calculates the matching score (verification score) between the above-described verification voice or feature values thereof and each of all records of the registered voice or feature values of the registered voice on the registered voice DB 7 by cosine distance or PLDA (Probabilistic Linear Discriminant Analysis) or the like. When the maximum value of the matching score exceeds a predetermined threshold value, the voice verification system determines that the verification has succeeded as a user associated with the registered voice or the registered feature amount in which the matching score becomes the maximum value. The method of verifying the user based on the maximum value of the matching score is merely an example, and any other verification method such as a verification using the feature average may be applied.

Figure 14:
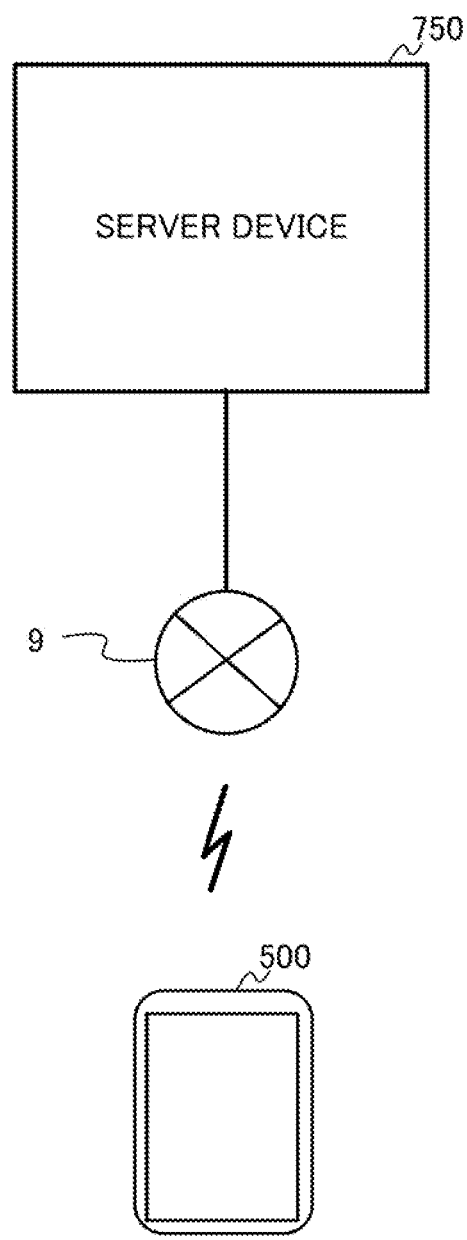
FIG. 14 illustrates an audio registration system equipped with a server device and a smartphone.

In the first example, a program (voice registration program) to be executed on the smartphone 500 has been described as a main executer, but the registration phase may be performed on any device other than the smartphone 500 functioning as a main executer. For example, a server device connected to the smartphone 500 via the network may function as the voice registration device according to any of the first to fourth example embodiments to execute the registration phase. FIG. 14 shows a voice registration system including a server device 750 and the smart phone 500. The server device 750 controls the sound input device (microphone) and the sound output device (speaker) of the smartphone 500 by transmitting a control signal to the smartphone 500 through the network 9, and functions as the voice registration device according to any of the first example embodiment to the fourth example embodiment. The server device 750 includes the registered voice DB 7, receives the voice data generated by the smartphone 500 during the voice registration period, and stores the received voice data or data indicating the feature values thereof in the registered voice DB 7 in association with the user identification information.

In this manner, the server device 750 can also suitably perform the registration phase.

Second Example

The second example is a specific example for the second example embodiment, and it is different from the first example in that the process related to the re-registration determination unit 240 is further executed.

Specifically, in the second example embodiment, according to the same process as the process in the verification phase, the smartphone 500 calculates the matching score corresponding to the degree of similarity between the speaker feature values extracted from the voice data generated during the voice input period and the speaker feature values of the silent environment voice data registered in advance. If the calculated matching score exceeds a predetermined threshold value for the re-registration determination, the smartphone 500 determines that the difference between the inputted voice data and the silent environmental voice data is small and the deformation of pronunciation due to the Lombard effect is insufficient. Thus, the smartphone 500 displays a message indicative of the insufficiency of the deformation and a "voice registration start icon" on the GUI to thereby accept the input of the voice data. Further, in this case, the smartphone 500 raises the volume of the reproduced noise, or changes the noise data to be reproduced so that the mode of the noise reproduction during the second voice input period is different from the mode of the noise reproduction during the first voice input period in which the deformation of pronunciation is insufficient.

In the example embodiments described above, the program is stored by any type of a non-transitory computer-readable medium (non-transitory computer readable medium) and can be supplied to a processor or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above can be described as, but not limited to, the following Supplementary Notes.

Supplementary Note 1

A voice registration device comprising:
a noise reproduction means configured to reproduce noise data during a time period in which voice input from a user is performed;
a voice data acquisition means configured to acquire the voice data based on the voice input; and
a voice registration means configured to register the voice data or data generated based on the voice data as data to be used for verification relating to a voice of the user.

Supplementary Note 2

The voice registration device according to Supplementary Note 1, further comprising
a noise reproduction voice input synchronization means configured to control the reproduction of the noise data so as to be synchronized with the voice input.

Supplementary Note 3

The voice registration device according to Supplementary Note 1 or 2, further comprising
a re-registration determination means configured to determine whether or not to re-acquire the voice data by the voice data acquisition means, based on a comparison result between silent environment voice data and the voice data based on the voice input, the silent environment voice data indicating registered voice data of the user generated under a silent environment.

Supplementary Note 4

The voice registration device according to Supplementary Note 3, wherein the re-registration determination means is configured to determine that it is necessary to re-acquire the voice data by the voice data acquisition unit if a feature distance between the silent environment voice data and the voice data based on the voice input is equal to or smaller than a predetermined threshold value.

Supplementary Note 5

The voice registration device according to Supplementary Note 5, wherein, if it is determined by the re-registration determination means that it is necessary to re-acquire the voice data by the voice data acquiring means, the noise reproduction means is configured to change parameters to be used at the time of reproducing the noise data again.

Supplementary Note 6

The voice registration device according to Supplementary Note 5, wherein, to change the parameters, the noise reproduction means is configured to
raise a volume of the reproduced noise data or
change the noise data to be reproduced.

Supplementary Note 7

The voice registration device according to any one of Supplementary Notes 1 to 6, further comprising
an echo canceller means configured to remove noise from the voice data based on the noise data.

Supplementary Note 8

The voice registration device according to any one of Supplementary Notes 1 to 7, further comprising
a display control means configured to display a meter indicating a volume of voice inputted in the time period.

Supplementary Note 9

The voice registration device according to Supplementary Note 8, wherein the display control means is configured to determine, based on whether or not the volume is within a range of a target volume, a display mode of the meter.

Supplementary Note 10

The voice registration device according to any one of Supplementary Notes 1 to 9, wherein the voice registration device is a plurality of devices configured to communicate with one another.

Supplementary Note 11

The voice registration device according to any one of Supplementary Notes 1 to 10, wherein the voice registration device is server device configured to communicate with a terminal device, the terminal device being equipped with an audio input device and an audio output device.

Supplementary Note 12

A control method executed by a computer, the control method comprising:
reproducing noise data during a time period in which voice input from a user is performed;
acquiring the voice data based on the voice input; and
registering the voice data or data generated based on the voice data as data to be used for verification relating to a voice of the user.

Supplementary Note 13

A program executed by a computer, the program causing the computer to:
reproduce noise data during a time period in which voice input from a user is performed;
acquire the voice data based on the voice input; and
register the voice data or data generated based on the voice data as data to be used for verification relating to a voice of the user.

Supplementary Note 14

A storage medium storing the program according to Supplementary Note 13.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

INDUSTRIAL APPLICABILITY

It can be applied to speaker verification applications to be used in devices such as smart speakers, vehicle navigation systems, robots, mobile phones, and hearable devices.

| DESCRIPTION OF REFERENCE NUMERALS | |
| --- | --- |
| 1, 1a, 1A, 1B, 1X | Voice registration device |
| 200 | Voice input unit |
| 210 | Voice registration unit |
| 220 | Noise reproduction unit |
| 230 | Noise reproduction voice input synchronization unit |
| 240 | Re-registration determination unit |
| 250 | Echo canceller unit |
| 500 | Smartphone |
| 750 | Server device |

What is claimed is:

1. A voice registration device comprising:
at least one memory storing instructions; and
at least one processor configured to execute the instructions to perform processing comprising:
providing instructions to start reproduction of noise;
in response to providing of the instructions to start the reproduction of the noise, starting the reproduction of the noise;
after starting the reproduction of the noise, providing instructions to start voice input;
in response to the instructions to start the voice input, starting the voice input and thereafter ending the voice input;
after ending of the voice input, providing instructions to end the reproduction of the noise;
in response to the instructions to end the reproduction of the noise, ending the reproduction of the noise;
after the ending of the voice input, determining whether or not to reacquire the voice input, based on a comparison between silent environment voice input and the voice input,
in response to determining to reacquire the voice input, repeating the processing with providing of the instructions to start the reproduction of the noise such that the noise is reproduced with different parameters, wherein it is determined to reacquire the voice input at least once;
in response to determining not to reacquire the voice input, registering the voice input;
wherein the voice registration device is a server device configured to communicate with a terminal device, and the terminal device is equipped with an audio input device and an audio output device,
wherein the silent environment voice input indicates different registered voice input generated in a silent environment; and
performing voice authentication based on a comparison of different voice input and the registered voice input, where the registered voice input is the voice input acquired during the reproduction of the noise.

2. The voice registration device according to claim 1, wherein the processing comprises controlling the reproduction of the noise data so as to be synchronized with the voice input.

3. The voice registration device according to claim 1, wherein the processing comprises reacquiring the voice input in a case where a feature distance between the silent environment voice input and the voice input is equal to or smaller than a predetermined threshold value.

4. The voice registration device according to claim 3, wherein the different parameters of the reproduction of the noise are
a raising a volume of the reproduction of the noise, or by
a changing the noise that is reproduced.

5. The voice registration device according to claim 1, wherein the processing comprises removing noise from the voice input based on the noise.

6. The voice registration device according to claim 1, wherein the processing comprises displaying a meter indicating a volume of the voice input.

7. The voice registration device according to claim 6, wherein the processing comprises determining, based on whether or not the volume is within a range of a target volume, a display mode of the meter.

8. A control method performed by a voice registration device and comprising:
providing instructions to start reproduction of noise;
in response to providing of the instructions to start the reproduction of the noise, starting the reproduction of the noise;
after starting the reproduction of the noise, providing instructions to start voice input;
in response to the instructions to start the voice input, starting the voice input and thereafter ending the voice input;
after ending of the voice input, providing instructions to end the reproduction of the noise;
in response to the instructions to end the reproduction of the noise, ending the reproduction of the noise;
after the ending of the voice input, determining whether or not to reacquire the voice input, based on a comparison between silent environment voice input and the voice input,
in response to determining to reacquire the voice input, repeating the processing with providing of the instructions to start the reproduction of the noise such that the noise is reproduced with different parameters, wherein it is determined to reacquire the voice input at least once;
in response to determining not to reacquire the voice input, registering the voice input,
wherein the voice registration device is a server device configured to communicate with a terminal device, and the terminal device is equipped with an audio input device and an audio output device,
wherein the silent environment voice input indicates different registered voice input generated in a silent environment; and
performing voice authentication based on a comparison of different voice input and the registered voice input, where the registered voice input is the voice input acquired during the reproduction of the noise.

9. A non-transitory computer readable storage medium storing a program executable by a voice registration device to perform processing comprising:
providing instructions to start reproduction of noise;
in response to providing of the instructions to start the reproduction of the noise, starting the reproduction of the noise;
after starting the reproduction of the noise, providing instructions to start voice input;
in response to the instructions to start the voice input, starting the voice input and thereafter ending the voice input;
after ending of the voice input, providing instructions to end the reproduction of the noise;
in response to the instructions to end the reproduction of the noise, ending the reproduction of the noise;
after the ending of the voice input, determining whether or not to reacquire the voice input, based on a comparison between silent environment voice input and the voice input,
in response to determining to reacquire the voice input, repeating the processing with providing of the instructions to start the reproduction of the noise such that the noise is reproduced with different parameters, wherein it is determined to reacquire the voice input at least once;
in response to determining not to reacquire the voice input, registering the voice input, wherein the voice registration device is a server device configured to communicate with a terminal device, and the terminal device is equipped with an audio input device and an audio output device, wherein the silent environment voice input indicates different registered voice input generated in a silent environment; and performing voice authentication based on a comparison of different voice input and the registered voice input, where the registered voice input is the voice input acquired during the reproduction of the noise.

\* \* \* \* \*